No. 869,913. PATENTED NOV. 5, 1907.
G. M. KRAUSS.
CALF WEANER.
APPLICATION FILED MAY 7, 1906.
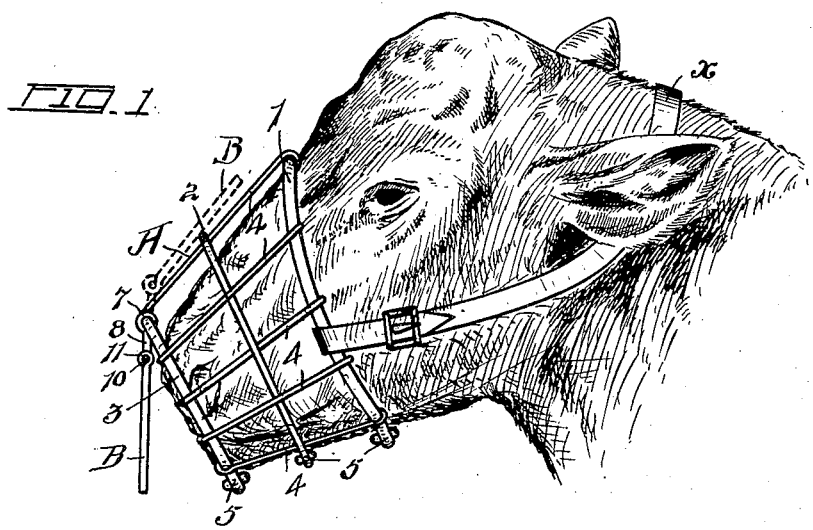
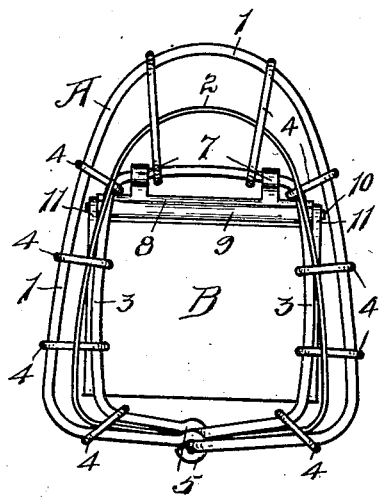 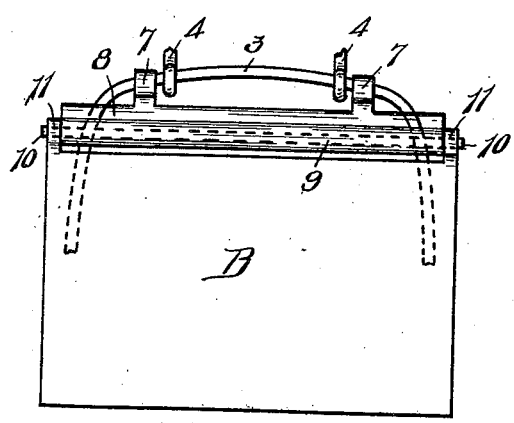
Witnesses:
Grace E. Gatewood
Inventor:
George M. Krauss.
By,
Attorneys.

UNITED STATES PATENT OFFICE.

GEORGE M. KRAUSS, OF OMAHA, NEBRASKA.

CALF-WEANER.

No. 869,913.  Specification of Letters Patent.  Patented Nov. 5, 1907.

Application filed May 7, 1906. Serial No. 315,607

*To all whom it may concern:*

Be it known that I, GEORGE M. KRAUSS, residing at Omaha, in the county of Douglas and State of Nebraska, have invented certain new and useful Improvements in Calf-Weaners, of which the following is a specification.

My invention primarily has for its object to provide a simple and effective calf weaner, which will readily and effectively serve its intended purposes.

In its generic nature, my invention embodies a wire cage adapted to be held over the mouth and nose of the calf, the cage having an open end which is closed by a flat gate of sheet metal that is hingedly secured to the wire cage by a double hinge joint so as to be susceptible of being folded up and fastened in its open position on top of the cage when desired, and also arranged to open by gravity to permit the calf feeding.

In its more subordinate nature the invention embodies the specific details of construction, which will be hereinafter first described in detail and then be specifically pointed out in the appended claims, reference being had to the accompanying drawing, in which:—

Figure 1, is a perspective view of my invention. Fig. 2, is a rear elevation thereof, looking toward the outer end of the cage. Fig. 3, is a detailed elevation of the gate showing the manner of connecting same to the cage.

In the drawings, in which like numerals and letters indicate like parts in all of the figures, A designates a wire cage which comprises main wire ring like members 1 and 3, which members are connected at suitable intervals by wire spacing rods 4, whose ends are bent over the wire rings 1 and 3 and an intermediate ring 2 is provided between the rings 1 and 3, the ring 2 being laced in between the wires or rods 4 passing on the outside of one and under the other alternately around the cage. Each of the rings 1, 2 and 3 have their ends joined together by eye-loops 5, as shown.

The rings 1, 2 and 3 are shaped to conform with the general cross sectional shape of a calf's head and the ring 1 is of a greater length than the ring 2 and the ring 2 in turn is of greater length than the ring 3, for purposes readily apparent.

The ring 3 has its upper end slightly flattened to receive the hinge member 8 which has a pair of bearing portions 7 held on the ring 3 at each side of the top connecting wires 4 as shown in Fig. 3, and the hinge member 8 has a long bearing portion 9 to receive the pivot shaft 10 on which the gate B is fulcrumed through the medium of the bearing ears 11 which straddle the bearing 9, as clearly shown in Fig. 3.

By constructing the device as shown and described, and particularly, by providing the double hinge connection between the gate B and the wire cage the same may be folded up as shown in dotted lines in Fig. 1 or may lie flat against the lower portion of the cage and may be fastened in this position by tying same down to the cage in a manner well understood. This could not be done were a single direct connection made between the gate B and the wire 3, owing to the bend in the wire 3.

A strap X is provided which passes behind the animal's ears and around the rim wire 1 to hold the cage on the animal's head.

From the foregoing description, taken in connection with the accompanying drawings, it is thought the complete construction and operation of my invention will be readily understood by those skilled in the art to which it appertains.

What I claim is:—

In a device of the character described, a wire cage or muzzle, consisting of a pair of main rings, connecting wires therefor, a supplemental ring interlaced between said connecting wires and arranged substantially parallel to the main rings, said rings each being composed of wire and having their ends looped together, an elongated hinge member having apertured ears pivotally secured to one of said main rings and having an elongated pin receiving portion, a pin in said pin receiving portion projecting beyond the ends thereof, and a sheet metal cage having apertured lugs to embrace said elongated portion of said hinge member and having apertures to receive said pin, substantially as shown and described.

In testimony whereof I affix my signature in presence of two witnesses.

GEORGE M. KRAUSS.

Witnesses:
FREDK. J. LARSON,
GRACE E. GATEWOOD.